United States Patent

Matthews et al.

[15] 3,670,316

[45] June 13, 1972

[54] CONTROL FOR DISC DRIVE APPARATUS

[72] Inventors: Richard D. Matthews; Martin O. Halfhill; Frank J. Sordello; Harold S. Yang, all of San Jose, Calif.

[73] Assignee: Information Storage Systems, Inc., Cupertino, Calif.

[22] Filed: Aug. 24, 1970

[21] Appl. No.: 66,526

[52] U.S. Cl. ..................340/174.1 C, 178/6.6 DD, 178/6.6 P

[51] Int. Cl. ........................................G11b 5/58, G11b 5/82

[58] Field of Search ............................340/174.1 C, 174.1 R; 178/6.7 A, 6.6 P, 6.6 DD

[56] References Cited

UNITED STATES PATENTS

| | | | |
|---|---|---|---|
| 3,530,447 | 9/1970 | Lambert | 340/174.1 C |
| 3,491,347 | 1/1970 | Farrand | 340/174.1 C |
| 3,361,873 | 1/1968 | Johnson | 178/6.7 A |
| 3,576,454 | 4/1971 | Beach | 340/174.1 C |

*Primary Examiner*—Howard W. Britton
*Attorney*—Gerald L. Moore and Robert B. Crouch

[57] ABSTRACT

A disc drive control for a disc drive apparatus, which control, during each power-on sequence, tests the various control functions individually and sequentially to ascertain if the disc drive apparatus is in proper working order.

7 Claims, 1 Drawing Figure

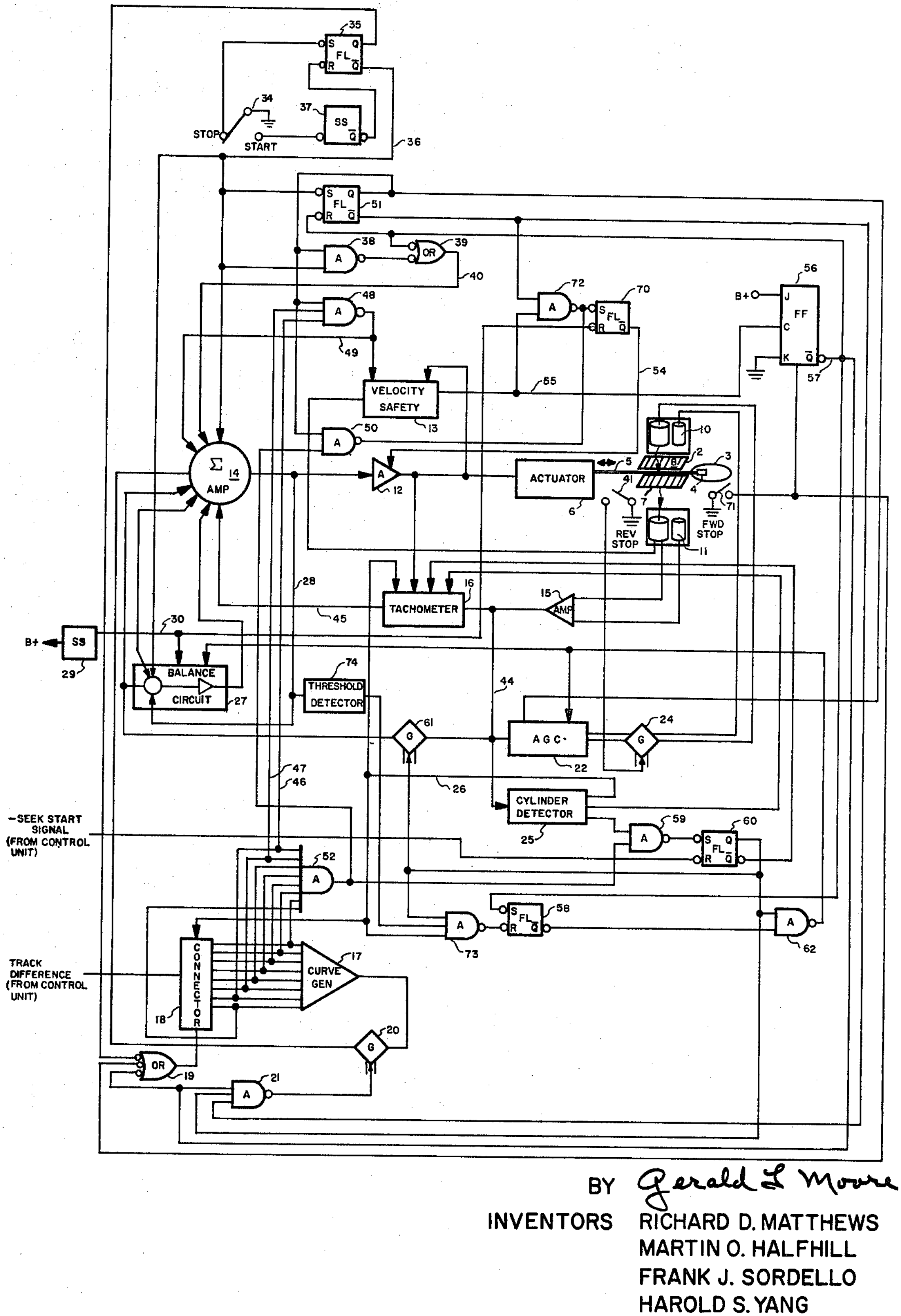
BY Gerald L. Moore
INVENTORS RICHARD D. MATTHEWS
MARTIN O. HALFHILL
FRANK J. SORDELLO
HAROLD S. YANG

CONTROL FOR DISC DRIVE APPARATUS

CROSS-REFERENCES TO RELATED APPLICATIONS

This invention relates generally to systems or components described in the following patent applications which are assigned to the assignee of the present invention.

U.S. Pat. application, Ser. No. 763,595, entitled "Apparatus for Loading and Unloading a Slider Assembly," filed on Sept. 30, 1968. Inventors: Stanley F. Brown and Steven J. MacArthur; now U.S. Pat. No. 3,531,788.

U.S. Pat. application, Ser. No. 792,343, entitled "Apparatus for Maintaining a Servo Controlled Member in a Selected Position, " filed on Jan. 21, 1969. Inventors: Russell K. Brunner, Timothy W. Martin and C. Richard Wilford.

U.S. Pat. application, Ser. No 792,386, entitled "Electronic Tachometer," filed on Jan. 21, 1969. Inventor: Frank J. Sordello.

U.S. Pat. application, Ser. No. 809,082, entitled "Power Driver," filed on Mar. 21, 1969. Inventor: Martin O. Halfhill.

U.S. Pat. No. Ser. No. 842,942, entitled "Unsafe Velocity Detection System," filed on July 18, 1969. Inventors: Martin O. Halfhill and Timothy W. Martin.

U.S. Pat. application, Ser. No. 851,695, entitled "Velocity Servo System," filed on Aug. 20, 1969. Inventors: Martin O. Halfhill and Frank J. Sordello.

U.S. Pat. application, Ser. No. 851,692, entitled "Balance Circuit for D. C. Servos," filed on Aug. 20, 1969. Inventors: Martin O. Halfhill and Frank J. Sordello.

U. S. Pat. application, Ser. No. 39,385, entitled "Smooth Wave Electrical Generator," filed on May 21, 1970. Inventor: Martin O. Halfhill.

U.S. Pat. application, Ser. No. 63,508, entitled "Position Sensor," filed on Aug. 13, 1970. Inventors: Timothy W. Martin, Frank J. Sordello and C. Richard Wilford.

BACKGROUND OF THE INVENTION

1. Field of the Invention

This invention relates to servo controls for controlling a movable device at a regulated speed, and more particularly, for controlling a linear drive device for positioning the read/write head of a disc drive apparatus.

2. Description of the Prior Art

In disc drive apparatus wherein a read/write head is moved across a rotating disc surface, it is necessary that the position of the head be controlled with precision to insure the integrity and retrievability of the data recorded. The head must be positioned in close proximity to the recording surface so that the data can be written at a high density. Each head usually is supported on an air bearing to control the spacing between the adjacent surfaces because any contact therebetween can result in damage to the magnetic film and the recording head. Additionally, to closely position the head at any of the written data tracks, the head must be moved at a controlled speed and stopped with precision accuracy. For this purpose a position transducer in cooperation with a position counter is utilized to generate signals for the calculation of the head position and detect the speed of movement of the head. All of the control systems are interdependent and a malfunction of any one can result in the loss or destruction of recorded data.

Naturally, it is important that all of these systems properly operate to read and record the data; and it is to this purpose that the subject invention is directed.

SUMMARY OF THE INVENTION

A control system for disc drive apparatus having a motor driven recording member, a read/write head movable at a predetermined speed adjacent the recording member and a variable speed actuator for moving the head across the recording member, wherein the control system comprises means to energize the apparatus and the variable speed actuator in combination with means to sequentially check the operating condition of the control and apparatus during each power-on sequence to ascertain if the apparatus is in condition for effecting data recording operations.

BRIEF DESCRIPTION OF THE DRAWINGS

FIG. 1 is a schematic diagram of the control system embodying the subject invention.

DESCRIPTION OF A PREFERRED EMBODIMENT OF THE INVENTION

In the present instance, the invention is utilized for controlling a disc drive apparatus 2 including at least one rotatable recording member or disc 3 on which data is written by the use of a read/write head or transducer 4. The head is supported on a carriage 5 mounted for movement effected by energization of a variable speed actuator or linear motor 6. Thus, as the disc is rotated, the head is moved radially relative to the axis of rotation of the disc and between end of travel positions for scanning across the disc surface. The data preferably is recorded on a magnetic film (not shown) on the disc surface in the normal manner of energizing electric coils (also not illustrated) in the read/write head. The data is recorded in concentric tracks on the disc with the corresponding vertically aligned tracks on the disc surfaces (where either both disc surfaces are used for recording or a plurality of discs are utilized) commonly being referred to as a cylinder position. In the usual case, there are 203 or more cylinders on which data is recorded.

The head is supported to "fly" above the recording surface on an air film, thereby necessitating that the disc be rotating at or near a predetermined speed. To assure the retrievability of the data, the head must be positioned in random sequence and with great accuracy at any desired cylinder position. A preferred method for locating each of the data tracks involves a transducer position sensing means utilizing an optical grating 7 fixed for movement with the actuator and carriage and on which are scribed a plurality of parallel lines with each line corresponding to a cylinder position on the discs. Parallel to this movable grating is a grating 8 stationarily positioned relative to the discs and having a plurality of scribed lines on the surface. With the position sensing means in a first or normal state, a pair of light emitting diodes 10 are energized and the emitted light is detected with the phototransistors 11, thereafter the relative positions of the grating lines are detected (indicated by the transmission or lack of transmission of light as the opaque lines come into alignment with movement of the carriage) to indicate the relative position of the transducer and disc track positions. Additionally, the velocity of carriage movement can be determined by sensing the passage of the movable grating past the stationary phototransistors in a manner to be described later.

The linear actuator 6 is energized by the power amplifier 12 with the level and direction of the power being determined by the signals received at the summing junction and amplifier 14. One such signal comes from the amplifier 15 which receives and amplifies the signals detected by the phototransistors 11. This signal is fed through a velocity sensing means or tachometer 16 to the summing junction for an indication of the velocity at which the carriage is being moved. Generally speaking, the tachometer receives a series of pulses corresponding to the passage of the gratings past the phototransistors and by detecting the pulses, a signal indicating the velocity of the carriage is generated. For a more complete description of this tachometer, reference can be made to U.S. Pat. application, Ser. No. 792,386, identified heretofore.

The signal received from the phototransistors 11 also is fed to a velocity safety circuit 13. The junction 14 compares the tachometer 16 signal with a signal received from the curve generator 17 whose output forms an envelope signal representing the allowed speed of the carriage as a function of the distance to the track at which the head is to be stopped. The curve generator acts in response to a signal received from the counter 18, which signal is set by the Or gate 19 and supplies a signal directly to the summing junction through the gate 20. The gate 20 is actuated by the And gate 21 in response to signals received from a hold-reverse latch 35, the forward stop switch and the flip flop 56. The latch is set by a signal through terminal S and reset through terminal R. Thus a negative or zero level voltage at S will cause Q to go to a designated voltage while Q bar will be zero volts. The opposite signals to the R and S terminals will cause Q to be zero and Q bar to be at the designated voltage. If the tachometer signal exceeds that of the curve generator, an indication is gained from amplifier 14 that the carriage is moving too fast and must be slowed. For a more complete description of the curve generator and velocity safety circuit, reference can be made to U. S. Pat. application, Ser. No. 39,385, identified heretofore.

To assure that the diodes 10 are transmitting sufficient light of a substantially constant intensity, the output signal from the amplifier 15 is also fed to an AGC circuit 22 which through gate 24, controls the energization of the light emitting diodes 10. The AGC compares the output signals from the two phototransistors and adjusts the bias on the diodes to maintain an even light intensity output. A more complete description of the AGC circuit can be obtained from reference to U.S. Pat. application, Ser. No. 792,343, identified heretofore.

The output signal from the amplifier 15 is also fed to a cylinder detector circuit 25 which supplies a signal through the line 26 to the counter 18, decrementing the counter each time a cylinder position is passed. Each cylinder position is detected by a change in signal level indicated by a phototransistor 11. The counter 18 thereafter changes the indication of the cylinder number at which the head is positioned so that a continual difference signal is generated for control of the curve generator 17.

Additionally, the total circuit is balanced by means of a balance circuit 27, which receives certain of the input signals (upon being energized) that are also received by the summing amplifier. By means of internal junction and amplifier stages, the balance circuit compares these signals with an output signal from amplifier 14 received through the conductor 28 to detect if any unwanted offset exists, i.e., is the output signal proper for the input signals received at that time. If an offset does exist the balance circuit serves to remove this offset by supplying an equal signal of opposite polarity. The balance circuit is energized by a single shot 29 which generates a power-on reset signal upon initial power on and transmits through the conductor 30 a signal turning on the circuit. A more complete description of the operation of the balance circuit can be obtained by reference to U.S. Pat. application, Ser. No. 851,692, identified heretofore. Thus, a constant balance signal is received at the summing amplifier for the proper energization of the power amplifier 12 to correctly drive the linear actuator 6.

In accordance with the present invention, there is supplied a control circuit for sequentially checking the operation of each of the components (heretofore described) at predetermined times during the operation of the disc drive unit to ascertain their proper functioning. The control circuit consists of a series of logic circuits uniquely interrelated to automatically check the operation of the control. To energize the control position of the disc file in preparation for reading and recording data, the start-stop switch 34 is moved from the stop to the start position, the hold-reverse latch 35 is in the "set" stage, thereby supplying through the conductor 36 a signal causing the summing amplifier 14 and power amplifier 12 to move the linear motor 6 to the hold-reverse position, i.e., a position against a retracted stop wherein the heads are removed from between the discs. With the switch moved to the "start" position, the single shot 37 pulses 15 seconds later to reset the hold-reverse latch. The time delay is sufficient to permit the disc (also energized when the total machine is energized) to reach normal rotational speed. Upon hold-reverse reset, the And gate 38 supplies a signal to the Or gate 39, thereby causing a signal to be supplied through the conductor 40 to the summing amplifier to signal the actuator 6 to drive the carriage forward at a slow speed of approximately 5 inches per second. During the time the carriage is in the hold-reverse position, the reverse stop or carriage retract switch 41 is closed, thereby opening the gate 24. Because the gate 24 is open, the light diodes 10 remain unenergized. With the diodes 10 now being energized by the opening of switch 41 and the subsequent closing of gate 24 a signal is transmitted through the phototransistor 11 and the amplifier 15 to the conductor 44 and the AGC circuit 22. The AGC circuit now functions to properly bias the light emitting diodes so that they are at an optimum emission level. The same signal from the amplifier 15 is fed to the tachometer 16 which through the conductor 45 regulates the speed of the carriage to exactly 5 inches per second. Similarly, the cylinder detector 25 receives the same signal and detects as cylinder positions are crossed. Initially, the counter 18 is set at 203 (the highest numbered data track position) and when the carriage has moved until the counter indicates position 63, the And gate 48 is activated by the signals receive through the conductors 46 and 47 to supply an output signal through the conductor 49 signaling a "drive forward 20 inches per second" to the summing amplifier 14. The carriage is now accelerated to 25 inches per second because of the summing of the two signals received at the summing amplifier indicating 20 and 5 inches per second.

Thus, testing means are provided in that the 25 inches per second velocity of the linear actuator represents an overspeed condition when And gate 48 is active (note gate 48 is an input to velocity safety 13). Ordinarily an overspeed condition would cause the velocity safety circuit to signal and cause movement of the linear motor into a hold-reverse mode and pull the recording head from the vicinity of the disc. During head load, the lack of an overspeed condition detection will cause heads to retract since the transducer speed sensing means is set to a second state.

If such an overspeed signal is not received within a short time, a signal is transmitted to the power amplifier through the conductor 54 serving to energize the power amplifier to a hold-reverse position to immediately back the linear motor to the hold-reverse position. This will occur if no overspeed signal occurs before counter 18 decrements to one, at which time And gate 52 is activated causing And gate 50 to activate setting unsafe latch 70. If such an overspeed signal is generated by the velocity safety circuit 13, Drive to Forward Stop Flip Flop 56 is set, causing Head Load latch 51 to reset to the first or normal state. With Head Load latch 51 reset, any further overspeed conditions will set unsafe latch 70 through And gate 72 and retract heads by a signal through line 54. Thus, a standard signal is transmitted through the conductor 55 to set the flip flop 56 which resets the latch 51, thereby closing the And gate 48 to terminate the 20 inches per second signal. At the same time, the Or gate 39 is maintained active to maintain the 5 inches per second velocity of the linear motor. The flip flop 56 through the conductor 57 sets the Seek in Process latch 58 to set counter 18 to a cylinder reading of 203. The carriage continues at 5 inches per second until the forward stop switch 71 closes to reset flip flop 56 which deactivates the Or gate 39 and activates the gate 20 by a signal effected through the And gate 21. The carriage accelerates in the reverse direction as specified by the curve generator 17 with counter 18 decrementing on each cylinder.

When counter 18 is set at "one", And gate 52 becomes active, which allows gate 59 to set the linear mode latch 60. This latch 60 opens gate 20 through And gate 21 and closes gate 61 initiating the final deceleration of the carriage to cylinder zero. When cylinder zero is reached, and a Threshold Detector 74 detects that amplifier 14 has zero output, the And gate 73 resets Seek in Process latch 58 causing the And gate 62 to conduct.

In this mode, the AGC circuit is set for normal operation from peak sampling to the slope of signal sampling as described heretofore. The And gate 62 additionally re-energizes the balance circuit 27 (necessary now because the single shot 29 has timed out and closed) and the total control is set for normal operation.

In this manner, the overall control is sequentially checked with the throwing of the switch 34 to the "on" position and the carriage is run through a single pass across the discs with the various circuits being automatically tested as heretofore described.

The invention claimed is:

1. A control system for a disc drive apparatus having a motor driven recording member, a transducer movable at a predetermined safe velocity adjacent the recording member for recording tracks of data on the member, and available speed actuator energizable for moving the transducer adjacent the recording member, said control system comprising;

position sensing means for supplying a position signal each time the transducer is adjacent a data track, velocity sensing means acting responsive to the position signal for supplying a velocity signal for slowing the actuator each time the transducer exceeds the predetermined safe velocity, velocity checking means for intentionally causing said transducer to overspeed including means to momentarily prevent the velocity signal from slowing the actuator to check the functioning of the position sensing means and the velocity sensing means, and means to energize the actuator to move the transducer to a predetermined position and to set the position sensing means to signal the transducer is at that predetermined position, thereby to calibrate the position sensing means to correctly signal the transducer track position.

2. A control system as defined in claim 1 wherein said position sensing means includes means for sensing and supplying the position signal when precise points on the actuator pass a point stationary to the recording member, thereby indicating relative positions of the transducer and the recording member.

3. A control system as defined in claim 2 wherein said positions on the actuator are indicated by indicia on an optical grating, and the position sensor includes light emitting and sensing devices for detecting the indicia and signaling their passage past the stationary point.

4. A control system for a disc drive apparatus having a motor driven recording member, a transducer movable along a path between limit of travel positions adjacent the recording member for recording data in tracks on the member, and a variable speed actuator energizable for moving the transducer, said control member comprising:

position sensing means including means for supplying a position signal each time the transducer crosses a data track, a counter for receiving the position signal and for signaling the track member at which the transducer is located, means to energize the actuator to move the transducer to a predetermined position, means to set the counter to signal the head is at that predetermined position and thereby calibrate the position sensing means to correctly signal the transducer location, means acting responsive to the counter signal to signal the maximum safe velocity at which the transducer can move at that position and still be stopped safely at the limit of travel position or desired track at which the transducer is to be stopped, and means acting responsive to the maximum velocity signal to slow the velocity of the actuator when the transducer velocity exceeds the maximum safe velocity.

5. A control system for a disc drive apparatus having a motor driven recording member, a transducer movable at a predetermined safe velocity adjacent the recording member, and a variable speed actuator for moving the transducer across the recording member, said control system comprising:

means to energize the control system and actuator for driving the recording member, transducer sensing means for sensing the speed of movement of the transducer said sensing means having a first state for signaling the velocity of movement of the transducer and a second state for signaling a single overvelocity condition, testing means energizable to set the sensing means to the second state and for energizing the actuator to move the transducer at a velocity exceeding the predetermined safe velocity to test the operability of the control system.

6. A control system as defined in claim 5 wherein said testing means is automatically reset to the first state after a single overvelocity condition is signaled.

7. A control system as defined in claim 6 including a maximum velocity generator for signaling the safe velocity the transducer can move each position, and means to compare the maximum velocity signal and the sensing means first state signal to generate a signal for controlling the maximum velocity of the transducer.

* * * * *